(12) United States Patent
Hiebert et al.

(10) Patent No.: US 7,066,474 B2
(45) Date of Patent: Jun. 27, 2006

(54) ELECTRONIC SUSPENSION AND LEVEL CONTROL SYSTEM FOR RECREATIONAL VEHICLES

(75) Inventors: Grant W. Hiebert, Salmon Arm (CA); Jack W. Fenkhuber, Salmon Arm (CA); Gerald W. Clancy, Salmon Arm (CA)

(73) Assignee: Valid Manufacturing Ltd., Salmon Arm (CA)

( * ) Notice: Subject to any disclaimer, the term of this patent is extended or adjusted under 35 U.S.C. 154(b) by 63 days.

(21) Appl. No.: 10/387,418

(22) Filed: Mar. 14, 2003

(65) Prior Publication Data

US 2004/0178587 A1 Sep. 16, 2004

(51) Int. Cl.
*B60G 17/056* (2006.01)

(52) U.S. Cl. .............. 280/6.153; 280/6.157; 280/5.514; 280/5.515; 280/124.16; 701/37

(58) Field of Classification Search ........ 280/5.514, 280/6.153, 6.157, 5.513, 5.507, 5.508, 5.512, 280/124.16, 5.515; 701/37
See application file for complete search history.

(56) References Cited

U.S. PATENT DOCUMENTS

| | | | |
|---|---|---|---|
| 3,573,884 | A | 4/1971 | Pollinger |
| 3,921,999 | A | 11/1975 | Masser |
| 3,963,261 | A | 6/1976 | Hiruma |
| 4,238,128 | A | 12/1980 | McKee |
| 4,373,744 | A | 2/1983 | Glaze |
| 4,462,610 | A | 7/1984 | Saito et al. |
| 4,518,169 | A | 5/1985 | Kuroki et al. |
| 4,580,798 | A | 4/1986 | Roelofs |
| 4,613,116 | A | 9/1986 | Buma |
| 4,614,247 | A | 9/1986 | Sullivan |
| 4,634,142 | A | 1/1987 | Woods et al. |
| 4,696,483 | A | 9/1987 | Takizawa et al. |
| 4,696,489 | A | 9/1987 | Fujishiro et al. |
| 4,709,934 | A | 12/1987 | Suzuki et al. |
| 4,733,876 | A * | 3/1988 | Heider et al. ............ 280/6.158 |
| 4,787,644 | A | 11/1988 | Yokote et al. |
| 4,852,863 | A | 8/1989 | Breitenbacher et al. |
| 4,881,753 | A | 11/1989 | Shima et al. |
| 4,934,731 | A | 6/1990 | Hiwatashi et al. |
| 5,005,858 | A | 4/1991 | Torrielli et al. |
| 5,048,867 | A | 9/1991 | Gradert |

(Continued)

FOREIGN PATENT DOCUMENTS

WO WO 00/06400 2/2000

*Primary Examiner*—Ruth Ilan
(74) *Attorney, Agent, or Firm*—Antony C. Edwards (57) ABSTRACT

The suspension and level control system for vehicles includes, so as to independently control inflation and deflation of left and right front and rear air-springs, corresponding left and right front and rear pneumatic circuits in fluid communication with a pressurized air source. Each airspring may have at least one air ride cushion reservoir mounted in a parallel pneumatic circuit in parallel fluid communication with the air-spring. Each pneumatic circuit includes a selectively actuable valve for selectively passing pressurized air from the air source into the corresponding parallel pneumatic circuit to selectively inflate the corresponding air-spring thereby raising a corresponding corner of the vehicle; and for selectively venting pressurized air from the corresponding parallel pneumatic circuit to selectively deflate the corresponding air-spring, thereby lowering a corresponding corner of the vehicle. An anti-dive valve in each circuit having a cushion reservoir selectively isolates the corresponding reservoir upon a control signal from a processor triggered by input from accelerometers.

19 Claims, 10 Drawing Sheets

U.S. PATENT DOCUMENTS

| | | |
|---|---|---|
| 5,127,667 A | 7/1992 | Okuda et al. |
| 5,130,927 A | 7/1992 | Kunishima et al. |
| 5,222,759 A | 6/1993 | Wanner et al. |
| 5,273,308 A | 12/1993 | Griffiths |
| 5,322,321 A * | 6/1994 | Yopp .................... 280/6.158 |
| 5,344,189 A | 9/1994 | Tanaka et al. |
| 5,375,873 A | 12/1994 | Thackray |
| 5,466,007 A | 11/1995 | Smith |
| 5,484,162 A | 1/1996 | Kanoh et al. |
| 5,566,971 A | 10/1996 | Perlot |
| 5,570,287 A | 10/1996 | Campbell et al. |
| 5,601,307 A | 2/1997 | Heyring et al. |
| 5,765,115 A | 6/1998 | Ivan |
| 5,864,768 A | 1/1999 | Bieber et al. |
| 5,999,868 A | 12/1999 | Beno et al. |
| 6,015,155 A | 1/2000 | Brookes et al. |
| 6,050,573 A | 4/2000 | Kunz |
| 6,157,879 A | 12/2000 | Kwack et al. |
| 6,173,974 B1 * | 1/2001 | Raad et al. .............. 280/6.157 |
| 6,189,903 B1 | 2/2001 | Bloxham |
| 6,203,026 B1 | 3/2001 | Jones |
| 6,234,493 B1 | 5/2001 | Kleen et al. |
| 6,264,213 B1 | 7/2001 | Kutscher |
| 6,293,562 B1 | 9/2001 | Kutscher |
| 6,332,623 B1 | 12/2001 | Behmenburg et al. |
| 6,338,014 B1 | 1/2002 | Heyring et al. |
| 6,382,370 B1 | 5/2002 | Girvin |
| 6,394,238 B1 | 5/2002 | Rogala |
| 6,398,236 B1 | 6/2002 | Richardson |
| 6,768,936 B1 | 7/2004 | Fiorletta et al. |
| 2001/0024021 A1 | 9/2001 | Allen et al. |

* cited by examiner

ELECTRONIC SUSPENSION AND LEVEL CONTROL SYSTEM FOR RECREATIONAL VEHICLES

FIELD OF THE INVENTION

This invention relates to the field of both vehicle suspension and level control systems.

BACKGROUND OF THE INVENTION

Applicant is aware of U.S. Pat. No. 5,288,102 which issued Feb. 22, 1994 to Machida for a Vehicle Height Control System. Machida discloses a compact vehicle height control system capable of changing the spring constant of gas springs to thereby control the vehicle attitude stabilizing characteristics so as to provide a comfortable vehicle ride. Pilot-controlled directional control valves are interposed in passages that connect first and second gas springs in parallel. When the pilot-controlled directional control valves are opened, the first and second gas springs are communicated with respective cylinders in parallel, whereas, when the directional control valves are closed, only the first gas springs are communicated with the cylinders, thereby changing the spring constant. The pilot-controlled directional control valves are hydraulically operable, thereby eliminating solenoid operated valves.

In the present invention it is an object to provide that which is neither taught nor suggested by Machida, namely a suspension system which employs ride cushion air reservoirs in parallel to provide for a more plush, well cushioned suspension for a coach while driving which is adapted to address the problem with such a soft suspension where a motor coach will, for example, dive during cornering. Thus, it is desirable, and an object of the present invention to make the suspension more firm as the coach enters a corner or otherwise subject to accelerations not ordinarily encountered during straight and level or gentle curves in the road. This is accomplished in the present invention by the use of lock out or "anti-dive" valves which close off the parallel air reservoirs from the suspension air-springs. It is a further object to provide for ride levelling and levelling of the vehicle about three axes.

SUMMARY OF THE INVENTION

The present invention is an advanced vehicle suspension and level control system for installation on vehicle suspensions utilizing two or more air-springs such as employed for example in recreational vehicles (RV's). The system utilizes a distributed sensing and control approach, utilizing one or more intelligent sensor and input/output (I/O) module(s) along with a system controller such as a data processor. The system is designed to operate with two or more degrees of freedom or control axes dependent on the specific application and suspension type.

On a chassis with mechanical spring front suspension system, a two axis system controls the level of the rear axle in relation to the non-controllable front axle, along with the longitudinal axis. That is, the two degrees of freedom of this system are rotation about the venicle's longitudinal axis and rotation about a pitch axis which is horizontal perpendicular to the longitudinal axis, and coincides with the front axles as governed by the vertical length of the two rear air springs along their two vertical axes. On a chassis with a single control air-spring type front suspension, a three axis system controls the level of the rear axle in relation to the front, along with controlling the pitch of, and rotation of the chassis about, the longitudinal axis. The three control points are two rear air-springs and a single control dual air-spring on the front axle. That is, the height of the two rear corners and front of the vehicle are actively controlled along the two rear corner air-spring vertical axes as before, with the addition of the front axle raising or lowering along a vertical third axis notionally between the two front corners. On a chassis with a dual control air-spring type front suspension in which the front air-springs are controlled independently, a four axis control method (one vertical axis for each of the four corner air-springs) is utilized to provide a high degree of system capability. Other suspension systems may also be suitable for the application of this system.

One function of this system is to provide automated and manual leveling of a parked vehicle. The manual leveling is accomplished through the use of system control requests which are transmitted via a Controller Area Network (CAN) to an intelligent sensor and I/O module(s). The system controller provides a means for an operator to accomplish this task and to provide input and feedback. When an operator places the system in manual mode, the operator can control the raising and lowering of the air-springs, either independently or simultaneously.

The system incorporates ride cushion air reservoirs in tandem with the air-springs which provide for a plush, well cushioned suspension while the vehicle is in motion. Another function of the present invention provides for a more firm suspension when the vehicle is, for example during cornering, subject to excess transverse or longitudinal accelerations not ordinarily encountered during straight-and-level or gentle curves in the road. In particular, the present invention incorporates lock-out or anti-dive valves which close off the parallel ride-cushion air reservoirs.

The vehicle may be automatically leveled when it is not in motion. Automatic leveling is accomplished by initiating an automatic level request message via the CAN to the intelligent sensor and I/O module(s). When this automatic leveling mode is initiated, the system purges air from all air-springs, which lowers the vehicle as close as possible to the ground. The system maintains the air purge for the duration specified and programmed by the vehicle manufacturer. Once the vehicle lowering time has been reached, the system stops the purge process and analyzes the tilt angle of the accelerometer(s) to determine which point of the vehicle is the highest relative to the rest. This point is the leveling reference point to which the remaining axes are raised. The system then begins to level the vehicle by monitoring the tilt angle data from the accelerometer while raising the remaining control points to that of the leveling reference point, thereby achieving an effective tilt angle of zero. Once the system achieves the initial 'zero', the system performs three iterations of verifying the level and adjusting the control points by raising or lowering them, if necessary. If so programmed by the vehicle manufacturer, the system controller may prevent excessive chassis twist by limiting the range of motion of each of the air-springs. This is accomplished by measuring and comparing the relative tilt angles of the front and rear transverse accelerometers. If the relative tilt angle exceeds the programmable limit defined by the vehicle manufacturer, further control action which will induce additional twist may be restricted.

In one embodiment of the invention, the vehicle is equipped with one or two ride height sensors per axle which connect directly to the intelligent sensor and I/O module(s) and produce a duty cycle modulated digital signal which directly corresponds to the rotational position of the sensor input shaft. Typically, the ride height sensor is mounted to the chassis and the input shaft is connected to a lever that is attached to the axle or suspension component that moves in relation to the chassis. Each ride height sensor incorporates a microcontroller and a rotational magnetic field detector, resulting in non-contact measurement of the rotational position of the input shaft. The ride height sensors provide dynamic sensing of the position of the chassis relative to the suspension. The feedback from the sensors may be used to manually set or actively control the ride height of the vehicle, for example to lower the height of the vehicle above the road to reduce drag during cruising, or to raise the vehicle when in rough terrain.

In summary, the suspension and level control system for vehicles according to the present invention includes, so as to independently control inflation and deflation of left and right rear air-springs, corresponding left rear and right rear pneumatic circuits in fluid communication with a pressurized air source, wherein each air-spring has at least one air ride cushion reservoir mounted in a parallel pneumatic circuit in parallel fluid communication with the air-spring, and wherein each pneumatic circuit includes a selectively actuable valve means for: (a) selectively passing pressurized air from the air source into the corresponding parallel pneumatic circuit to selectively inflate the air-spring thereby raising a corresponding corner of the vehicle; and, (b) selectively venting pressurized air from the corresponding parallel pneumatic circuit to selectively deflate the air-spring, thereby lowering a corresponding corner of the vehicle.

The system further includes at least one accelerometer for sensing a pitch angle and/or a roll angle of the vehicle about corresponding respective lateral and/or longitudinal axes of the vehicle. Data corresponding to at least the pitch inclination and/or roll inclination of the vehicle, which may also for example include rates of pitch and/or roll when the vehicle is in translation above a low non-static threshold, is communicated by a communication means to a processor. The communication means may be a wiring harness or buss or other means for transmission of a control signal from a processor. The processor may then send a control signal to the valve means to actively correct at least the pitch inclination and/or the roll inclination to attempt to return the vehicle to level or to within a preset range of acceptable limits when leveling the vehicle. Control signals to the valve means also allows for ride height adjustment.

In the preferred embodiment, selectively actuable anti-dive valves are mounted into the parallel pneumatic circuit so as to control fluid communication between the corresponding air-spring and its air ride cushion reservoir or reservoirs. The processor communicates with the anti-dive valves to selectively isolate the reservoirs from the corresponding pneumatic circuit upon data from the at least one accelerometer indicating excessive pitch and/or roll rates, when compared to preset threshold values, which would cause diving of the vehicle during maneuvering due to the added resiliency in the pneumatic circuit of the reservoir.

The accelerometers indicate longitudinal and/or lateral accelerations of the chassis exceeding preset threshold acceleration values. The processor determines corresponding pitch and/or roll rates corresponding to the accelerations and compares the pitch and/or roll rates to preset threshold pitch and/or roll rate values to predict diving of the vehicle during manoeuvring.

The system may further include front left and front right air-springs mounted to the chassis, the front air-springs in fluid communication with the air source via a single front pneumatic circuit mounted to the chassis. The vehicle is thus selectively levelable upon selective independent inflation or deflation of the left rear air-spring or the right rear air-spring or the front air-springs parallel to a corresponding three axes. The three axes may be vertical axes, one in each rear corner and one in the front of the vehicle. The front pneumatic circuit may have an air ride cushion reservoir mounted in a parallel pneumatic circuit in parallel fluid communication therewith.

Alternatively, the system may include a front left air-spring mounted to the chassis in fluid communication with the air source via a front left pneumatic circuit mounted to the chassis, and a front right air-spring mounted to the chassis in fluid communication with the air source via a front right pneumatic circuit mounted to the chassis. The vehicle is thus selectively levelable upon selective independent inflation or deflation of the air-springs parallel to a corresponding four axes, where the four axes may be vertical axes, one in each front and rear corner of the vehicle. The left front and right front pneumatic circuits may each have an air ride cushion reservoir mounted in a parallel pneumatic circuit in parallel fluid communication therewith.

DETAILED DESCRIPTION OF EMBODIMENTS OF THE INVENTION

Figure 1:
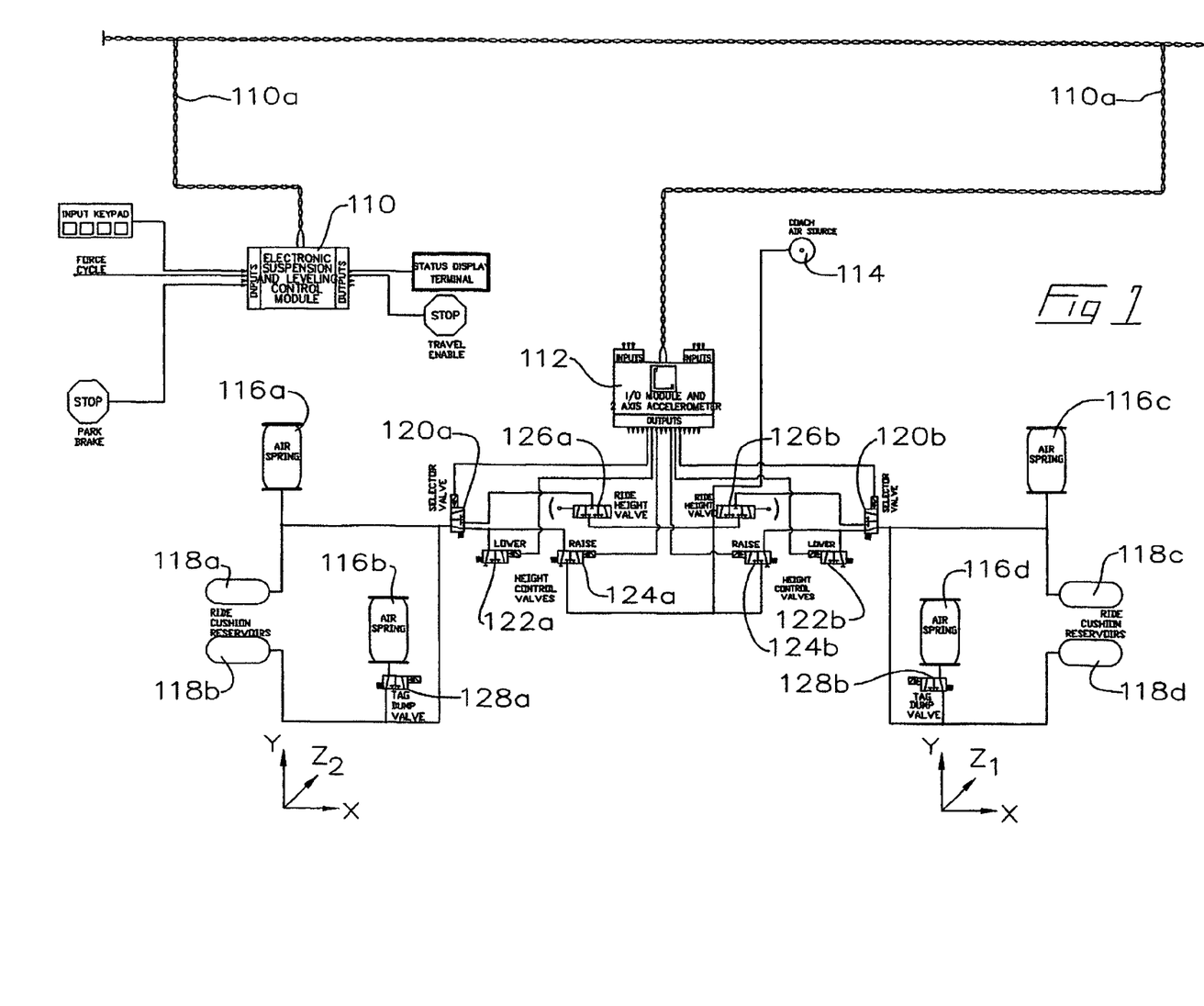
FIG. 1 is a schematic view representing a chassis equipped with a mechanical spring front suspension system and a two axis method for controlling levelling according to the present invention.

In FIG. 1, air from coach air source 114 is introduced into left rear air-springs 116a and 116b, right rear air-springs 116c and 116d, left rear ride cushion reservoirs 118a and 118b, and right rear side cushion reservoirs 118c and 118d. Air-springs 116a, 116b, 116c and 116d expand and contract in response to the opening and closing of height control valves 122a, 122b, 124a and 124b, thereby controlling the height of the vehicle, in particular the height of each rear corner of the vehicle along two vertical axes Z and $Z_2$ corresponding to each rear corner. A control module 110 is connected to an I/O module and X, Y axis accelerometers 112. The I/O module is connected to selector valves 120a and 120b and to height control valves 122a, 122b, 124a, and 124b. Tag dump valves 128a and 128b serve to vent the corresponding airbag located in the tag axle suspension, thereby to effectively transfer its load to the drive axle in order to increase traction. Height control valves 122a and 122b, each labelled "LOWER", vent air from the corresponding air-springs 116a–d.

Figure 2:
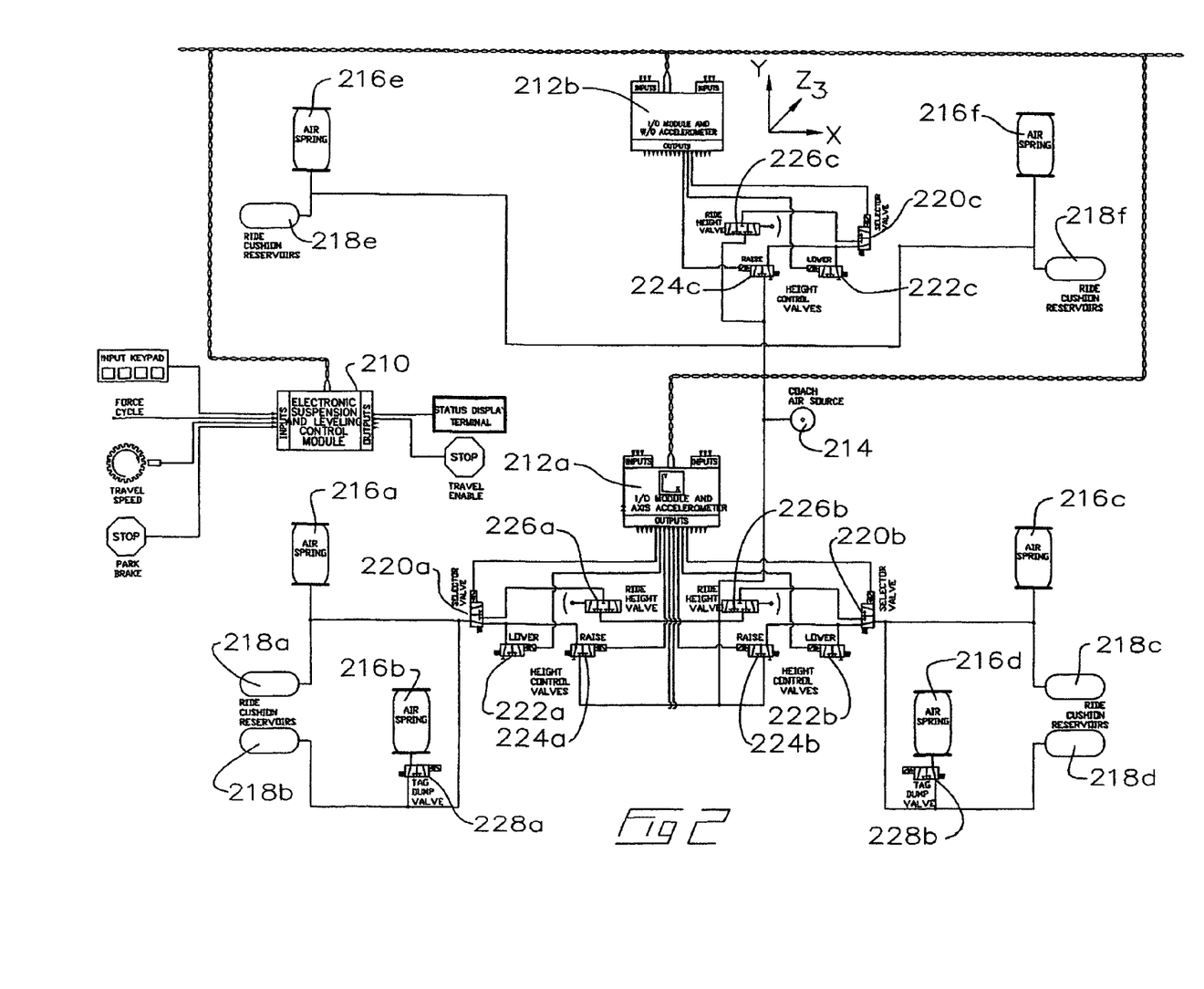
FIG. 2 is a 3-axis schematic view representing a chassis equipped with a single control air-spring type front suspension system and a three axis method for controlling levelling.

FIG. 2 shows the chassis of FIG. 1 with the addition of front I/O module and accelerometer 212b, which is connected to front selector valve 220c and front height control valves 222c and 224c. Front left and right air-springs 216e and 216f, and front left and right ride-cushion reservoirs 218e and 218f are also added. This additional single pneumatic circuit provides for collectively (that is not independently) raising and lowering the front corners of the vehicle along a notional third vertical axis $Z_3$.

Figure 3:
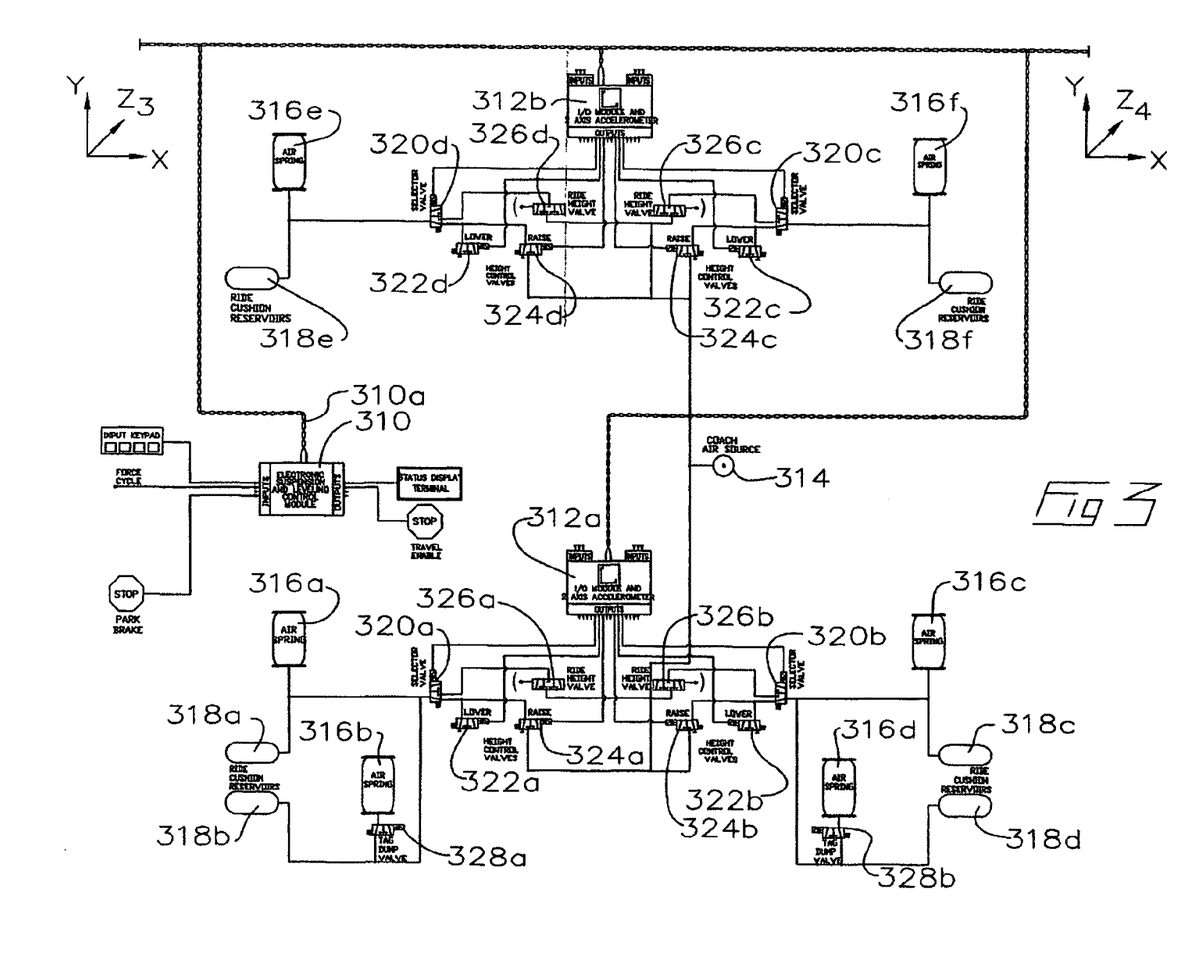
FIG. 3 is a 4-axis schematic view representing a chassis equipped with a dual control air-spring type front suspension and a four axis method for controlling levelling.

FIG. 3 shows the chassis shown in FIG. 2 plus additional front selector valve 320d, front height control valves 322d and 324d, and front ride height valve 326d. This provides a second pneumatic circuit controlling the front air-springs so that the left front air-springs may be independently actuated notionally along axis $Z_3$, independently of right front air-springs notionally along axis $Z_4$.

Figure 4:
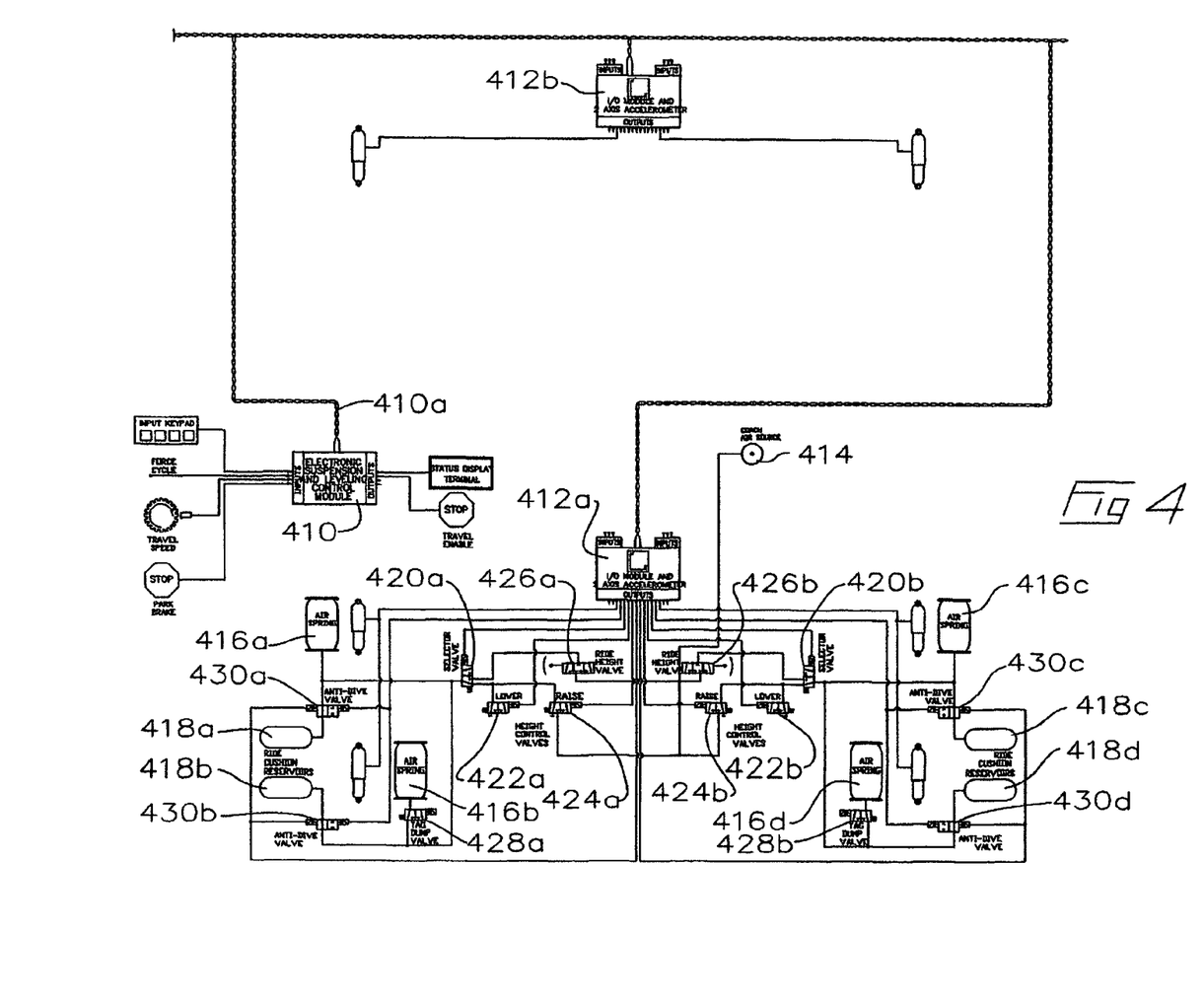
FIGS. 4, 5 and 6 represent embodiments corresponding to FIGS. 1, 2, and 3, respectively, with the addition of anti-dive valves.

FIG. 4 shows the chassis shown in FIG. 1 plus rear left anti-dive valves 430a and 430b and rear right anti-dive valves 430c and 430d.

Figure 5:
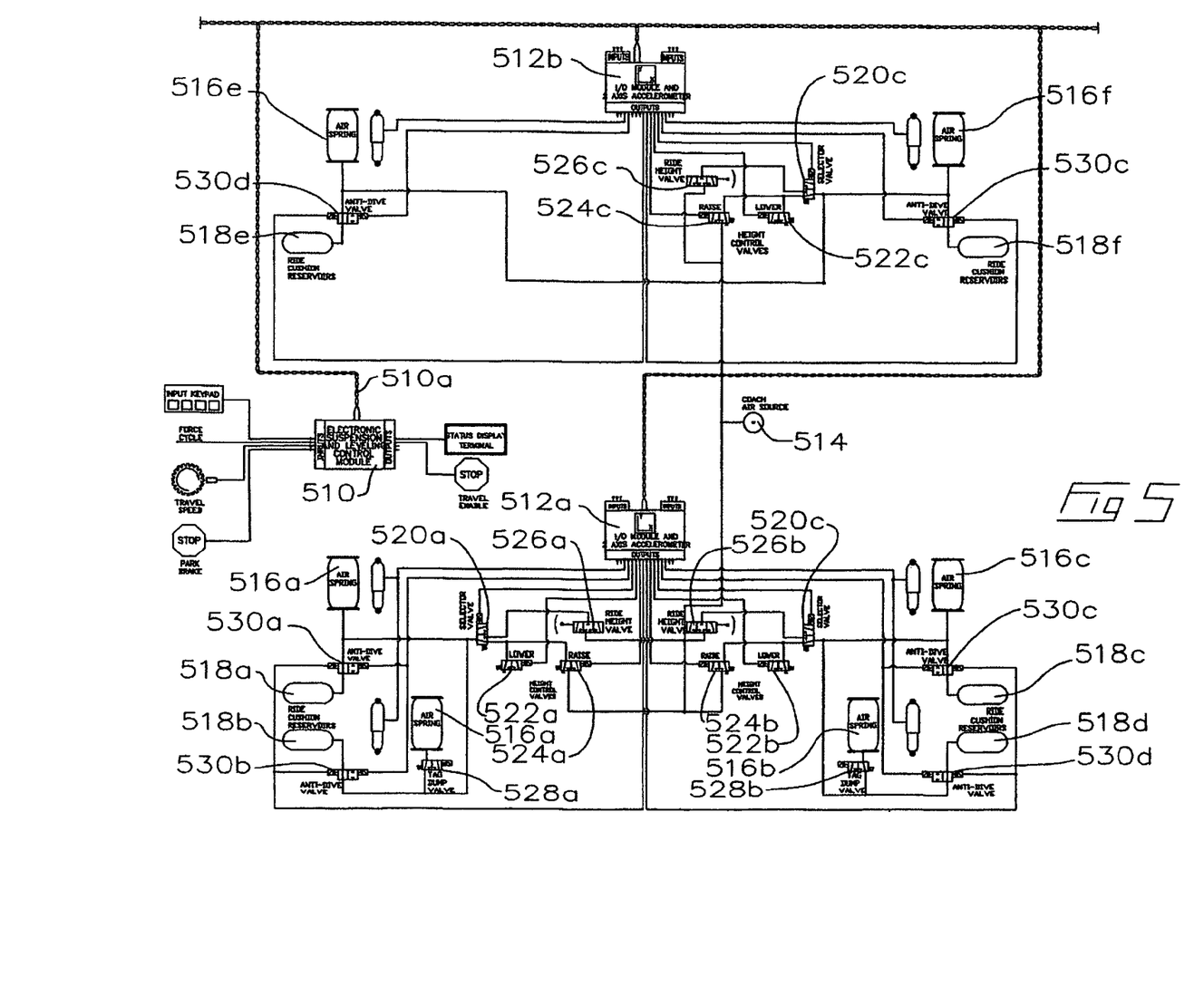

FIG. 5 shows the chassis shown in FIG. 2 plus the anti-dive valves shown in FIG. 4 and additional front left anti-dive valve 530d and front right anti-dive valve 530e.

Figure 6:
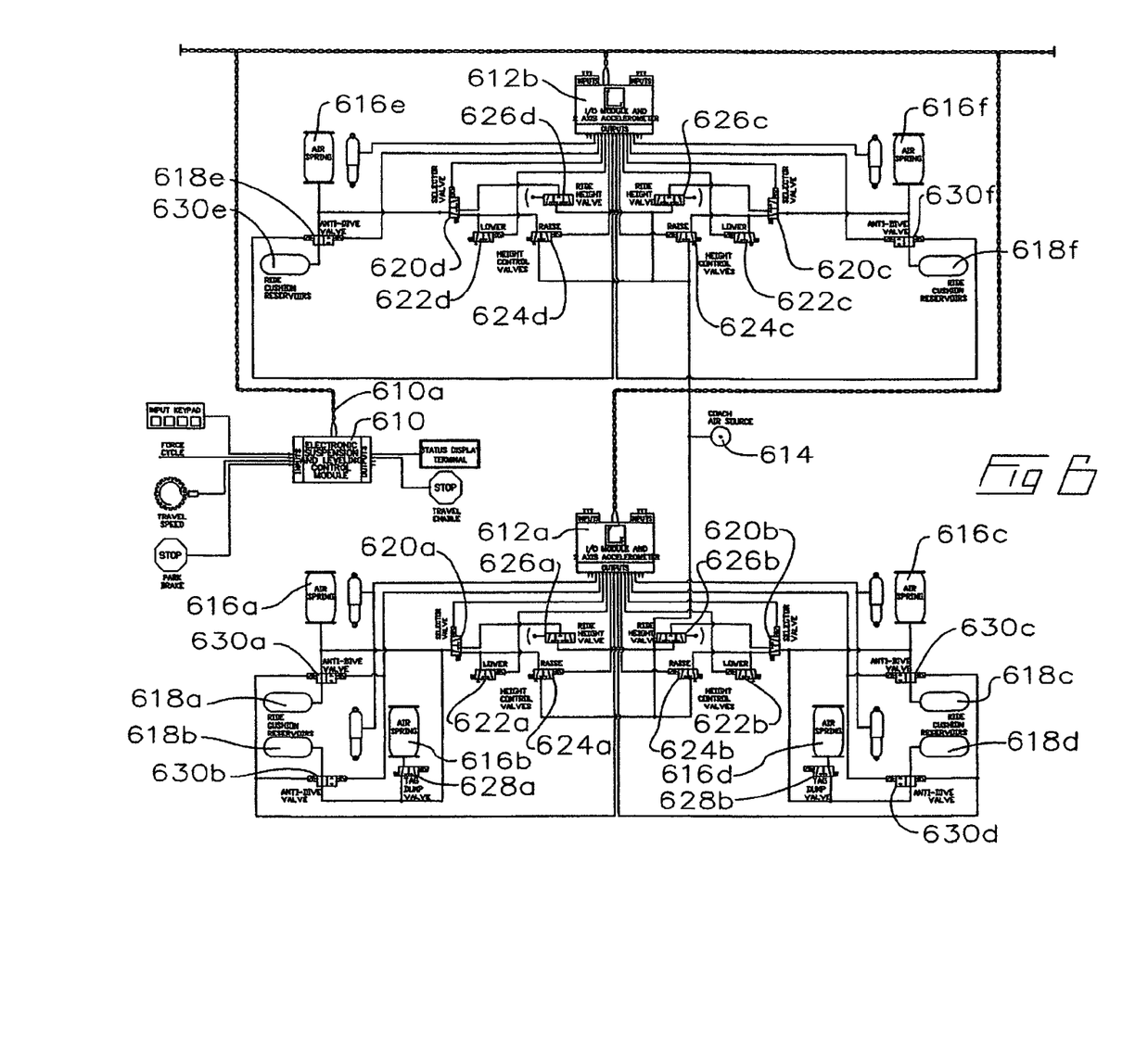

FIG. 6 shows the chassis shown in FIG. 3 plus the anti-dive valves shown in FIG. 5.

Figure 7:
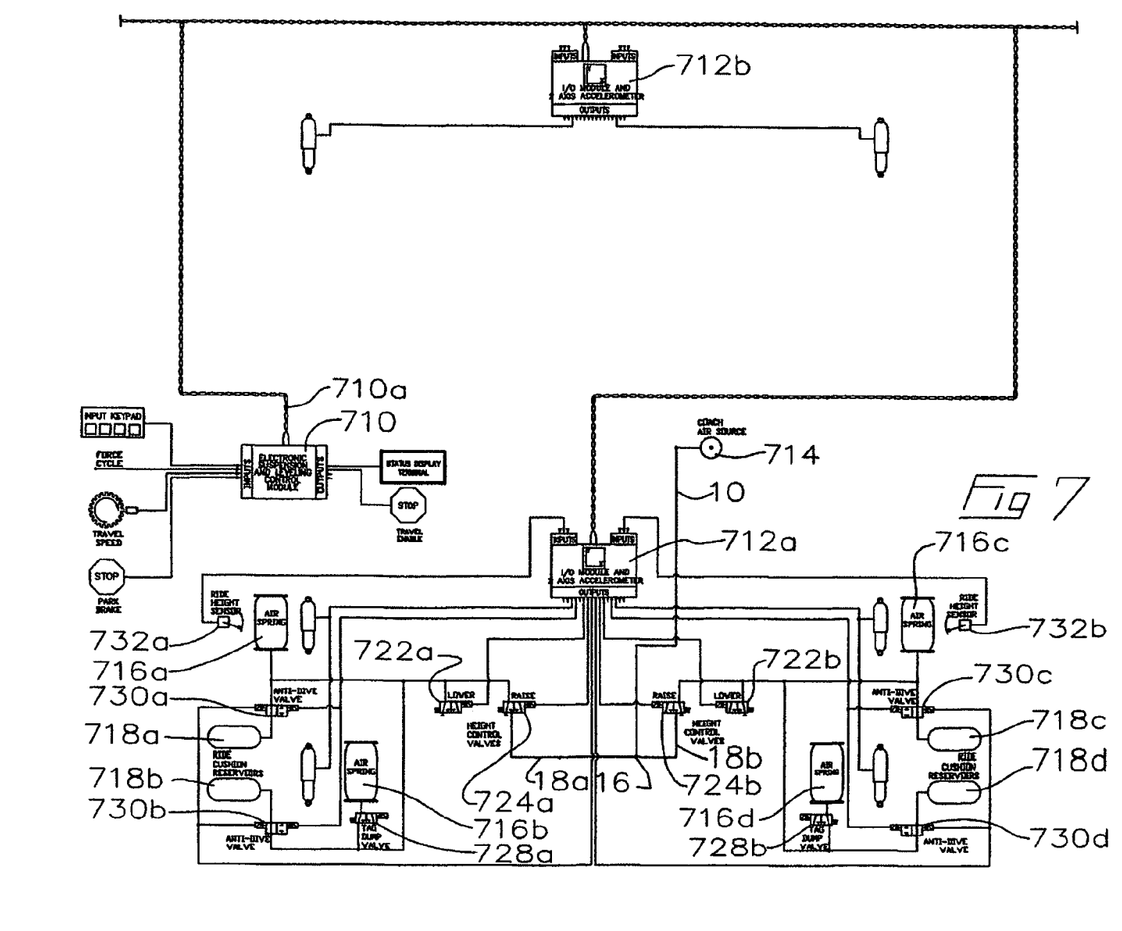
FIGS. 7, 8 and 9 represent embodiments corresponding to FIGS. 4, 5 and 6, respectively, with the deletion of selector valves and ride height valves, and the addition of ride-height sensors.

FIG. 7 shows the chassis shown in FIG. 4 without ride height valves. Left rear ride height sensor 732a and right rear right height sensor 732b are added, each diagrammatically illustrated as interposed between the upper and lower ends of the corresponding air-spring but intended to be mounted to an arm, strut etc which rotates relative to the chassis as the chassis moves vertically relative to the ground. The height sensors detect the vehicle, that is chassis height and output a signal representative of the detected vehicle height. The detected vehicle height is then compared by the control module processor to the desired or required vehicle height and the requisite adjustment made, if any, by sending the corresponding signals to open or close the raise or lower height control valves.

Figure 8:
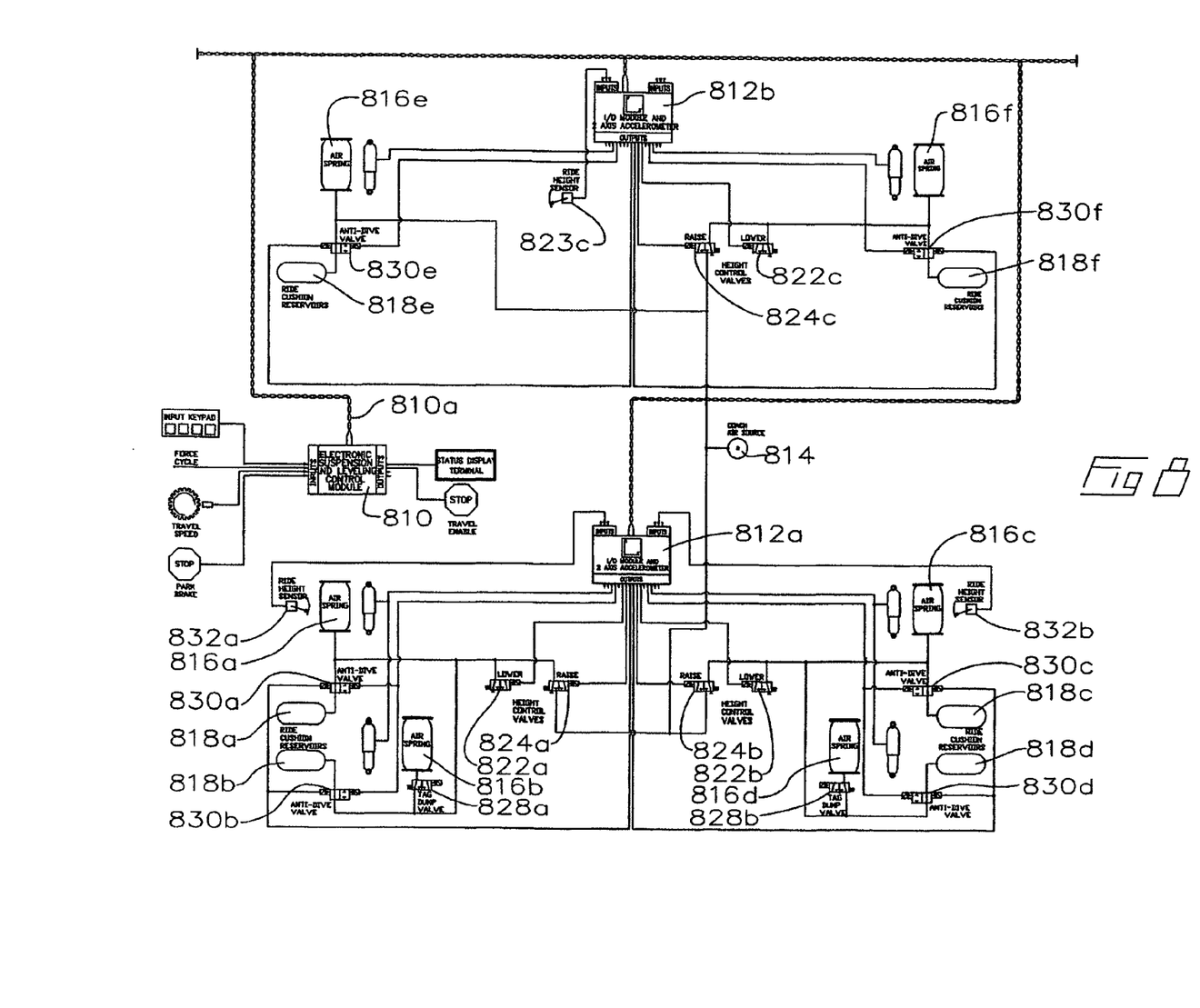

FIG. 8 shows the chassis shown in FIG. 5, without ride height valves and associated lines. Their function is replaced by ride height sensors such as incorporated into FIG. 7, plus an additional front ride height sensor 832c to detect, collectively, the height of the front of the vehicle from the ground.

Figure 9:
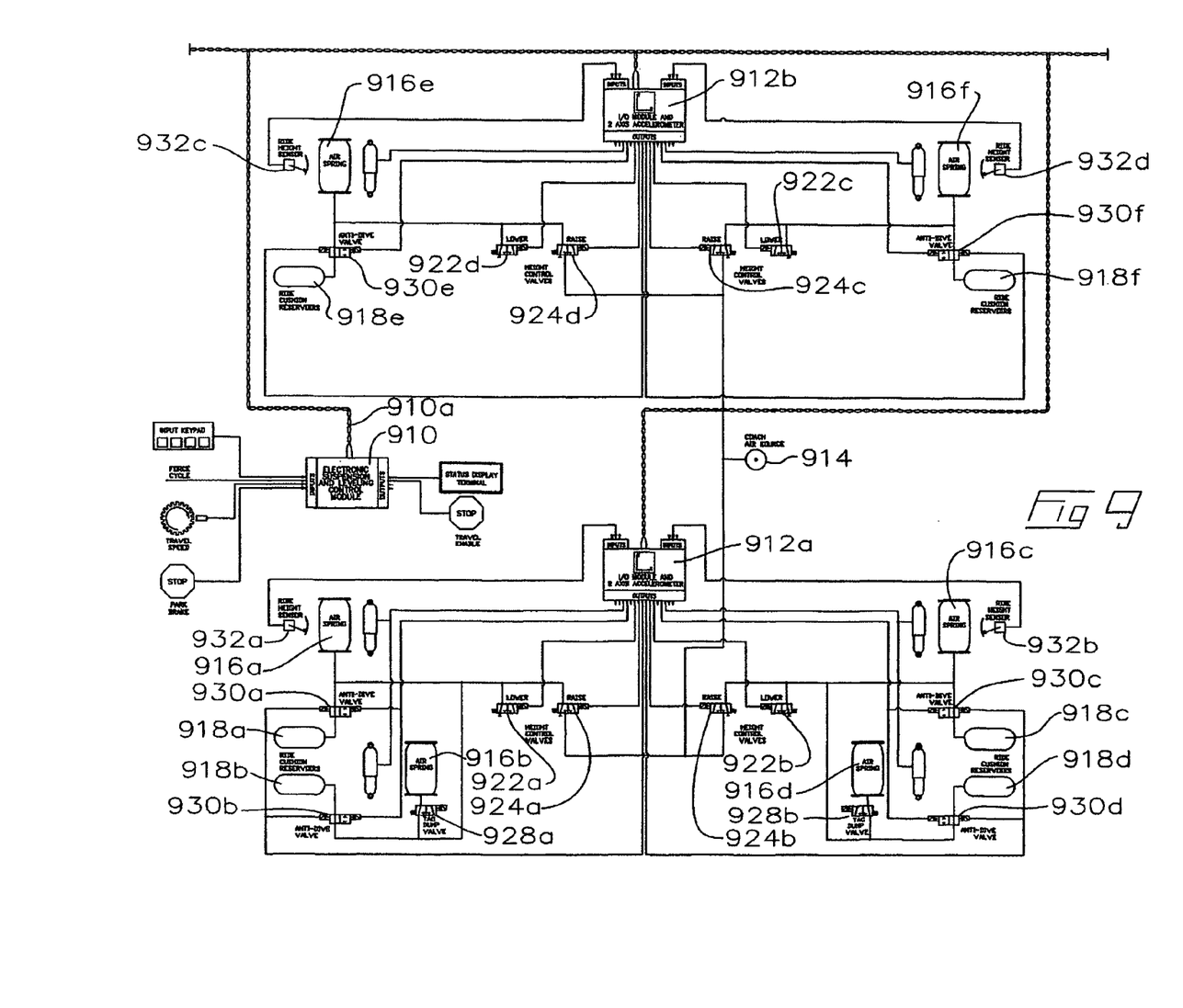

FIG. 9 shows the chassis shown in FIG. 6 without ride height valves and associated lines. Ride height sensors such as incorporated into FIG. 8 replace the function of the ride height valves. An additional front ride height sensor 932d is added to provide for independent left and right adjustment of the height of the front corners.

Figure 1A:
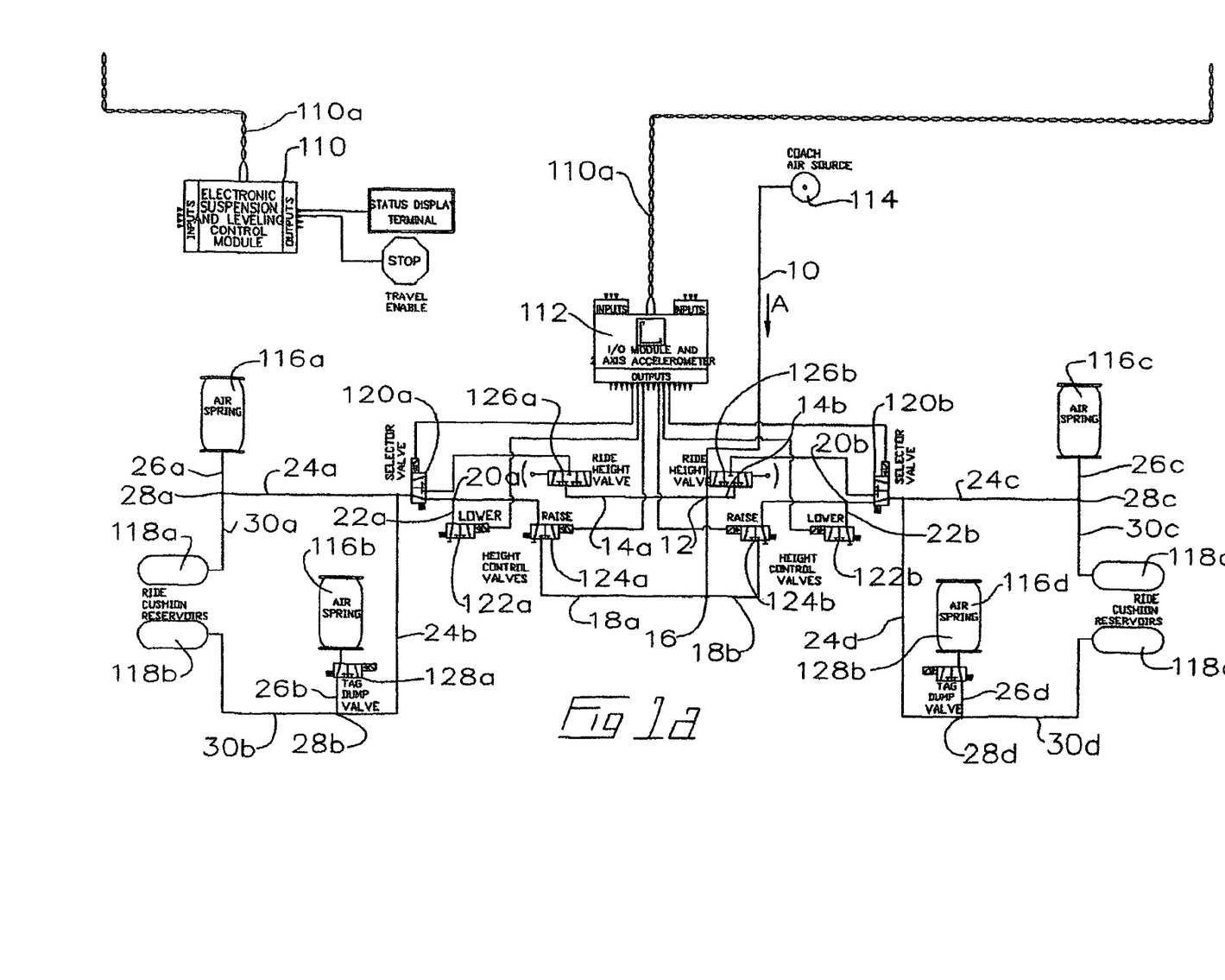
FIG. 1a is an enlarged view of a portion of FIG. 1.

In use, as illustrated in FIG. 1a, pressurized air flow is provided by air source 114 so as to flow in direction A along line 10. Line 10 branches at junction 12 into lines 14a and 14b. Line 10 terminates at T-junction 16, splitting into lines 18a and 18b. Flow through lines 14a and 14b is controlled by valves 126a and 126b respectively. Flow through lines 18a and 18b is controlled by valves 124a and 124b respectively. Lines 18a and 18b branch downstream of valves 124a and 124b respectively at junctions 20a and 20b into lines 22a and 22b. Lines 22a and 22b terminate at valves 122a and 122b respectively.

Lines 14a and 18a terminate downstream at selector valve 120a. Lines 14b and 18b terminate downstream at selector valve 120b. The biasing of selector valves 120a and 120b determines whether airflow from lines 14a and 14b respectively, or airflow from lines 18a and 18b respectively enter air-spring feed lines 24a–24d. Airflow in air-spring feed lines 24a–24d communicates with air-springs 116a–116d respectively via branch lines 26a–26d at junctions 28a–28d. Lines 30a–30d also branch from junctions 28a–28d respectively, and feed airflow to and from air cushion reservoirs 118a–118d respectively.

The biasing of valves 124a, 124b, 122a, 122b, and 120a, 120b is controlled by instructions from control module 110 via network bus 110a and I/O module 112. For example, in travel mode, valve 120a is biased to pass airflow between line 14a and lines 24a, 24b so that valve 126a regulates the airflow to air-springs 116a, 116b to adjust the ride height. During travel the shock absorbing resiliency of the air-springs is supplemented by air cushion reservoirs mounted in parallel, on lines 30a, 30b, with the air-springs. In modes permitting manual adjustment of the height of the RV above the ground (that is, adjusting the length or expansion of air-spring 116a), or in automatic modes, for example for automatic levelling of the RV while the RV is static, valve 120a is biased to pass airflow between line 18a and lines 24a, 24b so that valves 122a, 124a regulates the airflow to (in the case of valve 124a) and from (in the case of valve 122a) air-springs 116a, 116b to adjust the height of the RV chassis in the corresponding corner, in this case the left rear. Opening valve 124a raises the corner by expanding the air-springs. Opening valve 122a lowers the corners by venting air from the air-springs.

As may be seen, the ride height valve 126a and associated branch line 14a, and the raise valve 124a of the height control valves on branch line 18a form a first kind of parallel pneumatic circuit between junction 12 and selector valve 120a. Thus, the outputs from the I/O module 112 which control the biasing of selector valve 120a will regulate which of the two parallel branches of the first kind of parallel pneumatic circuit will govern the downstream actuation of the air-springs 116a, 116b. The use of a parallel pneumatic circuit downstream from a pressurized air source which incorporates two branches, one of which provides for ride height control, and the other of which provides for static height control, the operative branch depending on the biasing of a selector valve common to the two branches, for downstream actuation of one or more air-springs, is the basic pneumatic circuit upon which the illustrated embodiments of FIGS. 1–6 are based. Thus in FIG. 1, two such "first kind" of pneumatic circuits, also parallel to each other, are employed to independently control the height of the left rear corner of the vehicle chassis (see the pneumatic circuit where the parallel branches are lines 14a and 18a), and the right rear corner of the vehicle chassis (see the pneumatic circuit where the parallel branches are lines 14b and 18b).

The use of the same kind of parallel pneumatic circuits are employed as the building blocks in the further embodiments of FIGS. 2–6. In particular, in FIG. 2, a further single pneumatic circuit having parallel branches which respectively include ride height valve 226c and height control raising valve 224c extend in parallel between air source 214 and selector valve 220c. This single pneumatic circuit then governs the raising and lowering collectively of the left and right forward corners of the vehicle's chassis. In the embodiment of FIG. 3, the left and right forward corners are independently elevated and lowered by the use of two of the parallel pneumatic circuits such as employed for the left and right rear corners, the pneumatic circuits in FIG. 3 for the left and right rear corners being the same as those in FIGS. 1 and 2. The commonality of components of the parallel pneumatic circuits between the various Figures is indicated by the last two digits of the reference numeral for a particular component. The first digit of the reference numeral for a particular component merely indicates the corresponding Figure number. Thus for example, selector valve 120*b* in FIG. 1 is the same component as selector valve 320*b* in FIG. 3, the difference in numbering merely indicating that component 120*b* comes from the embodiment of FIG. 1 and component 320*b* comes from the embodiment of FIG. 3.

FIGS. 4, 5 and 6 repeat the build up of the number of parallel pneumatic circuits in the same sequence as found in FIGS. 1, 2 and 3 so that in FIG. 4, as in FIG. 1, only two parallel pneumatic circuits are employed, those being to independently control the height of the rear corners of the vehicle chassis. In FIG. 5, as in FIG. 2, a third parallel pneumatic circuit is added to control the height, collectively, of the front corners of the vehicle chassis. In FIG. 6, as in FIG. 3, a further parallel pneumatic circuit is added to the front of the vehicle so that the height of each of the four corners of the vehicle chassis are independently controlled by their own parallel pneumatic circuit. As noted above, what is added to the embodiment of FIGS. 4–6 is suspension, for example such as the shock absorbers illustrated, corresponding to each of the air-springs.

Also what is added to the embodiments of FIGS. 4–6 is the use of anti-dive valves, in FIG. 4 labelled with reference numerals 430*a*, 430*b*, 430*c*, and 430*d*. Again, is understood that in FIGS. 5 and 6, following the nomenclature employed with FIGS. 1–3, the corresponding parts in FIG. 5 are labelled by reference numerals 530*a*–530*d*, and in FIG. 6 by reference numerals 630*a*–630*d*. The anti-dive valves are used to isolate the ride cushion reservoirs, in FIG. 4 labelled for reference 418*a*–418*d*. The air-springs and their corresponding reservoirs are in fluid communication in a parallel pneumatic circuit which forms the second kind of parallel pneumatic circuit found in the system according to the present invention.

Thus during straight and level translation, that is travel, or during mild manoeuvring, the ride cushion reservoirs are left in open fluid communication with their corresponding air-springs, in FIG. 4 air-springs 416*a*–416*d*. Anti-dive valves 430*a*–430*d* are closed so as to isolate the ride cushion reservoirs and block the open fluid communication between the reservoirs and their corresponding air-springs upon their corresponding accelerometers, in FIG. 4 those in I/O module 412*a*, detecting a threshold longitudinal acceleration and/or lateral acceleration which, were the ride cushion reservoirs not isolated from their corresponding air-springs, would cause excessive corresponding pitch and/or roll of the recreational vehicle due to the extra resiliency provided by the pneumatic ride cushion reservoirs.

In FIGS. 7–9, the parallel pneumatic circuits of FIGS. 1–6 are modified to remove the branch lines corresponding to the ride height valves. Thus in the embodiment of FIG. 7, line 10 merely feeds into branch lines 18*a* and 18*b* via T-junction 16, through raise height control valves 724*a* and 724*b* to feed air flow into air-springs 716*a*–716*d*. The function of the ride height valves is replaced by the use of ride height sensors 732*a* and 732*b* providing data to control module 710 via I/O module 712*a* with the resulting height control signals from control module 710 being providing via I/O modules 712*a* to the height control valves, so as to open valves 724*a* and 724*b* and to close 722*a* and 722*b* when the height of the vehicle is to be increased, and conversely to close valves 724*a* and 724*b* and to open valves 722*a* and 722*b* when it is required to lower the height of the vehicle. Again, anti-dive valves, being in FIG. 7 anti-dive valves 730*a*–730*d*, are employed to isolate the air cushion reservoirs, being in FIG. 7 air cushion reservoirs 718*a*–718*d*, upon the detection of excessive pitch and/or roll by the accelerometers in I/O module 712*a*.

In FIG. 8, a further single pneumatic circuit containing a pair of raise and lower height control valves 824*c* and 822*c* respectively, in conjunction with ride height sensor 832*c* are employed to collectively control the left and right front corners of the vehicle. In FIG. 9 the height of the left and right front corners of the vehicle are independently controlled by their own separate pneumatic circuits through their corresponding height control valves 924*c*, 922*c* for the front right corner, and 924*d* and 922*d* for the front left corner. Again, each pneumatic circuit employs a corresponding anti-dive valve, in FIG. 9 anti-dive valves 930*a*–930*f*.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A suspension or level control system for a vehicle comprising:

left and right parallel pneumatic circuits, said left and right parallel pneumatic circuits parallel to each other and mounted to a chassis of the vehicle so as to extend to opposite sides of the vehicle, said circuits in fluid communication with a pressurized air source so as to independently control inflation and deflation of corresponding left and right air-springs of the vehicle, and wherein each said pneumatic circuit includes a selectively actuable height control valves for:

a) selectively passing pressurized air from said air source into the corresponding said parallel pneumatic circuit to selectively inflate the corresponding said air-spring thereby raising a corresponding corner of said chassis; and, b) selectively venting pressurized air from the corresponding said parallel pneumatic circuit to selectively deflate the corresponding said air-spring, thereby lowering a corresponding corner of said chassis, at least one accelerometer on the vehicle providing acceleration data indicating tilt of the vehicle when the vehicle is static and dynamic acceleration including tilt when the vehicle is moving, and means for monitoring said acceleration data cooperating with said selectively actuable height control valves so as to selectively actuate said passing pressurized air or said venting pressurized air.

2. The system of claim 1 wherein said at least one accelerometer is mounted to said chassis and senses a pitch angle and/or a roll angle of said chassis about corresponding respective lateral and/or longitudinal axes of said chassis.

3. The system of claim 2 wherein data from said at least one accelerometer corresponding to at least said pitch angle and/or said roll angle of said chassis is communicated by communication means to a processor, and wherein said processor is programmed to communicate a control signal by said communication means to said height control valves to thereby actively urge said chassis to level by lowering a high corner of the vehicle and/or by raising a low corner of the vehicle so that at least said pitch angle and/or said roll angle return to within a preset limit range.

4. The system of claim 3 wherein each air-spring of said left and right air-springs has at least one air ride cushion reservoir mounted in a corresponding said parallel pneumatic circuit in parallel fluid communication with said each air-spring.

5. The system of claim 4 further comprising a selectively actuable anti-dive valve mounted into each said parallel pneumatic circuit so as to control fluid communication between the corresponding said air-spring and its corresponding said air ride cushion reservoir.

6. The system of claim 5 wherein said processor communicates by said communication means with each said anti-dive valve to selectively isolate each said reservoir from the corresponding said pneumatic circuit in response to said data from said at least one accelerometer indicating longitudinal and/or lateral accelerations of said chassis exceeding preset threshold acceleration values.

7. The system of claim 6 wherein said processor determines corresponding pitch and/or roll rates corresponding to said accelerations and compares said pitch and/or roll rates to preset threshold pitch and/or roll rate values to predict diving of the vehicle during manoeuvring.

8. The system of claim 3 wherein said left and right air-springs include rear left and rear right air-springs and front left and front right air-springs mounted to said chassis, said front left and front right air-springs in fluid communication with said air source via a single front pneumatic circuit mounted to said chassis, wherein said vehicle is selectively levelable upon selective independent inflation or deflation of said left rear air-spring or said right rear air-spring or said front left or front right air-springs parallel to a corresponding three axes.

9. The system of claim 8 wherein each pneumatic circuit of said left rear and right rear pneumatic circuits and said front pneumatic circuit has an air ride cushion reservoir mounted in parallel fluid communication therewith.

10. The system of claim 9 further comprising a selectively actuable anti-dive valve mounted into each said parallel pneumatic circuit so as to control fluid communication between the corresponding said air-spring and its corresponding said air ride cushion reservoir.

11. The system of claim 10 wherein said processor communicates by said communication means with each said anti-dive valve to selectively isolate each said reservoir from the corresponding said pneumatic circuit in response to said data from said at least one accelerometer indicating longitudinal and/or lateral accelerations of said chassis exceeding preset threshold acceleration values.

12. The system of claim 11 wherein said processor determines corresponding pitch and/or roll rates corresponding to said accelerations and compares said pitch and/or roll rates to preset threshold pitch and/or roll rate values to predict diving of the vehicle during manoeuvring.

13. The system of claim 8 wherein said three axes are vertical axes, one in each rear corner and one in the front of said vehicle.

14. The system of claim 3 wherein said left and right air-springs include front left and front right air-springs and wherein said left and right parallel pneumatic circuits include front left and front right pneumatic circuits, said front left air-spring mounted to said chassis in fluid communication with said air source via said front left pneumatic circuit mounted to said chassis, and said front right air-spring mounted to said chassis in fluid communication with said air source via said front right pneumatic circuit mounted to said chassis, wherein said vehicle is selectively levelable upon selective independent inflation or deflation of said air-springs parallel to a corresponding four axes.

15. The system of claim 14 wherein each pneumatic circuit of said parallel pneumatic circuits has an air ride cushion reservoir mounted in parallel fluid communication therewith.

16. The system of claim 15 further comprising a selectively actuable anti-dive valve mounted into each said parallel pneumatic circuit so as to control fluid communication between the corresponding said air-spring and its corresponding said air ride cushion reservoir.

17. The system of claim 16 wherein said processor communicates by said communication means with each said anti-dive valve to selectively isolate each said reservoir from the corresponding said parallel pneumatic circuit in response to said data from said at least one accelerometer indicating longitudinal and/or lateral accelerations of said chassis exceeding preset threshold acceleration values.

18. The system of claim 17 wherein said processor determines corresponding pitch and/or roll rates corresponding to said accelerations and compares said pitch and/or roll rates to preset threshold pitch and/or roll rate values to predict diving of the vehicle during manoeuvring.

19. The system of claim 14 wherein said four axes are vertical axes, one in each front and rear corner of said vehicle.

* * * * *